United States Patent
Shin et al.

(10) Patent No.: US 12,146,048 B2
(45) Date of Patent: Nov. 19, 2024

(54) THERMOPLASTIC RESIN COMPOSITION

(71) Applicant: LG CHEM, LTD., Seoul (KR)

(72) Inventors: Dong Kun Shin, Daejeon (KR); Seo Hwa Kim, Daejeon (KR); Byoung Il Kang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 538 days.

(21) Appl. No.: 17/609,647

(22) PCT Filed: Oct. 6, 2020

(86) PCT No.: PCT/KR2020/013591
§ 371 (c)(1),
(2) Date: Nov. 8, 2021

(87) PCT Pub. No.: WO2021/085881
PCT Pub. Date: May 6, 2021

(65) Prior Publication Data
US 2022/0213310 A1    Jul. 7, 2022

(30) Foreign Application Priority Data

Oct. 30, 2019   (KR) .......................... 10-2019-0136200

(51) Int. Cl.
*C08L 51/04* (2006.01)
*C08L 25/12* (2006.01)
*C08L 83/00* (2006.01)

(52) U.S. Cl.
CPC .............. *C08L 51/04* (2013.01); *C08L 25/12* (2013.01); *C08L 83/00* (2013.01); *C08L 2205/035* (2013.01)

(58) Field of Classification Search
CPC .......... C08L 25/12; C08L 35/04; C08L 35/06; C08L 51/00; C08L 51/003; C08L 51/04; C08L 83/00
See application file for complete search history.

(56) References Cited

U.S. PATENT DOCUMENTS

| | | | |
|---|---|---|---|
| 4,874,807 A | 10/1989 | Endo et al. | |
| 4,879,331 A | 11/1989 | Endo et al. | |
| 2007/0270540 A1 | 11/2007 | Kanae et al. | |
| 2008/0242779 A1 | 10/2008 | Gaggar | |
| 2010/0048798 A1 | 2/2010 | You et al. | |
| 2012/0322945 A1* | 12/2012 | Tomita | C08L 25/12 525/73 |
| 2016/0253790 A1 | 9/2016 | Putraya et al. | |
| 2016/0333178 A1* | 11/2016 | Shimozawa | C08J 5/00 |
| 2017/0137620 A1 | 5/2017 | Iwanaga et al. | |
| 2018/0037732 A1 | 2/2018 | Shimoda et al. | |
| 2018/0086906 A1 | 3/2018 | Eim et al. | |

FOREIGN PATENT DOCUMENTS

| | | | |
|---|---|---|---|
| CN | 109 503 972 A | 3/2019 | |
| JP | H08208964 A | 8/1996 | |
| JP | H09279045 A | 10/1997 | |
| JP | 2011184649 A | 9/2011 | |
| JP | 2015120937 A | 7/2015 | |
| JP | 6155340 B2 | 6/2017 | |
| JP | 6155349 B2 | 6/2017 | |
| KR | 10-1990-0000450 B1 | 1/1990 | |
| KR | 10-1991-0007337 B1 | 9/1991 | |
| KR | 10-0778012 B1 | 11/2007 | |
| KR | 10-2011-0079011 A | 7/2011 | |
| KR | 10-2017-0099413 A | 8/2017 | |
| WO | WO-2014135549 A1 * | 9/2014 | .......... C10M 145/14 |
| WO | WO2019243105 A1 * | 12/2019 | |
| WO | WO-2020006130 A1 * | 1/2020 | .......... C08F 230/085 |

OTHER PUBLICATIONS

Supplementary European Search Report for related European Patent Application No. EP 20880682.8 dated May 30, 2022, 6 pages.
Office Action issued on Oct. 30, 2023 for the corresponding Chinese patent application 202080033203.4.
International Search Report and Written Opinion issued in corresponding International Patent Application No. PCT/KR2020/013591 , dated Oct. 6, 2020.
Office Action issued in corresponding Korean Patent Application No. 10-2020-0128859, dated Dec. 14, 2022.

\* cited by examiner

*Primary Examiner* — John M Cooney
*Assistant Examiner* — Jeffrey S Lenihan
(74) *Attorney, Agent, or Firm* — Morgan, Lewis & Bockius LLP

(57) ABSTRACT

Disclosed is a base resin including at least one rubber graft copolymer selected from a diene-based rubber graft copolymer and an acrylic rubber graft copolymer and a vinyl cyanide-aromatic vinyl-based copolymer, a first silicone oil having a viscosity of 100 cPs to 1,000 cPs as measured according to ASTM D445, and a second silicone oil having a viscosity of 5,000 cPs to 20,000 cPs as measured according to ASTM D445.

11 Claims, No Drawings

THERMOPLASTIC RESIN COMPOSITION

CROSS-REFERENCE TO RELATED APPLICATIONS

This application claims the benefit of Korean Patent Application No. 10-2019-0136200, filed on Oct. 30, 2019, in the Korean Intellectual Property Office, the disclosure of which is incorporated herein in its entirety by reference.

TECHNICAL FIELD

The present invention relates to a thermoplastic resin composition, and particularly, to a thermoplastic resin composition from which a resin and a molded product with excellent processability and excellent scratch resistance may be provided.

BACKGROUND ART

A thermoplastic resin composition including a diene-based rubber graft copolymer or an acrylic rubber graft copolymer has excellent processability, moldability, impact resistance, strength, and gloss, and is widely used in various electric and electronic components, and popularly used as, in particular, a material for an inner cabinet of a refrigerator.

A thermoplastic resin composition, which is for an inner cabinet of a refrigerator and includes a diene-based rubber graft copolymer or an acrylic rubber graft copolymer, is not produced through injection molding but produced through extrusion molding followed by vacuum molding.

Meanwhile, a larger extrusion sheet needs to be manufactured from a thermoplastic resin composition for an inner cabinet of a refrigerator as the refrigerator becomes larger. However, the large extrusion sheet thus manufactured is highly likely to have a scratch during a manufacturing process.

Therefore, a method of reducing the surface gloss of a molded product to make a scratch less visible by applying rubber having a large particle size to a composition has been used conventionally, but this method has a problem of lowering the scratch resistance and impact resistance of the extrusion sheet. Another method is to produce an extrusion sheet by adding other materials such as methyl methacrylate having excellent hardness into a composition, but this method has a problem in that the moldability is deteriorated during vacuum molding for manufacturing refrigerator components after manufacturing the extrusion sheet.

Accordingly, there is a demand for a composition from which a resin and a molded product having excellent physical properties such as scratch resistance as well as excellent extrusion processability may be provided.

PRIOR ART LITERATURE

Patent Literature (Patent literature 1) JP6155340B2

DISCLOSURE OF THE INVENTION

Technical Problem

An objective of the present invention provides a thermoplastic resin composition from which a resin and a molded product with excellent processability and excellent scratch resistance may be provided.

However, the objective to be achieved by the present invention is not limited to the above-mentioned objective, and other objectives that are not mentioned will be clearly understood by those skilled in the art from the following description.

Technical Solution

In order to achieve the above objective, an embodiment of the present invention provides a thermoplastic resin composition including: a base resin comprising a rubber graft copolymer and a vinyl cyanide-aromatic vinyl-based copolymer; a first silicone oil having a viscosity of 100 cPs to 1,000 cPs as measured according to ASTM D445; and a second silicone oil having a viscosity of 5,000 cPs to 20,000 cPs as measured according to ASTM D445.

Advantageous Effects

A thermoplastic resin composition according to an embodiment of the present invention may provide a resin and a molded product with excellent processability and excellent scratch resistance.

MODE FOR CARRYING OUT THE INVENTION

Hereinafter, the present invention will be described in more detail to allow for a clearer understanding of the present invention.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

In the specification, when a part "includes" a component, this means that other components may be further included rather than excluding other components unless otherwise stated.

In the present invention, the weight average molecular weight may be measured as a relative value to the standard PS (standard polystyrene) sample through GPC (gel permeation chromatography, waters breeze) using THF (tetrahydrofuran) as the eluate.

An embodiment of the present invention provides a thermoplastic resin composition including: a base resin having a rubber graft copolymer and a vinyl cyanide-aromatic vinyl-based copolymer; a first silicone oil having a viscosity of 100 cPs to 1,000 cPs as measured according to ASTM D445; and a second silicone oil having a viscosity of 5,000 cPs to 20,000 cPs as measured according to ASTM D445.

Hereinafter, the components of the thermoplastic resin composition according to an embodiment of the present invention will be described in detail.

1. Base Resin

1) Rubber Graft Copolymer

A rubber graft copolymer may provide excellent processability, scratch resistance, impact resistance, heat resistance, weather resistance, elongation, coloring, chemical resistance, and surface gloss properties to a thermoplastic resin composition.

According to an embodiment of the present invention, the rubber graft copolymer may include at least one selected from among a diene-based rubber graft copolymer and an acrylic rubber graft copolymer.

The diene-based rubber graft copolymer may provide excellent heat resistance, impact resistance, and processability to a thermoplastic resin composition, and the acrylic rubber graft copolymer may provide excellent weather resistance, impact resistance, elongation, colorability, chemical resistance, processability, surface gloss property and whitening property to a thermoplastic resin composition.

The diene-based rubber graft copolymer may be obtained by graft copolymerization of a vinyl-based monomer to a diene-based rubber polymer, and preferably obtained by graft copolymerization of an aromatic vinyl-based monomer and a vinyl cyanide-based monomer to the diene-based rubber polymer.

The diene-based rubber polymer may be a polymerized product of a diene-based monomer, the diene-based monomer may be at least one selected from among 1,3-butadiene, isoprene, chloroprene, and piperylene, and specifically, the diene-based monomer may be 1,3-butadiene.

The aromatic vinyl monomer may be at least one selected from among styrene, α-methyl styrene, α-ethyl styrene and p-methyl styrene, and specifically, the aromatic vinyl monomer may be styrene.

The vinyl cyanide-based monomer may be at least one selected from among acrylonitrile, methacrylonitrile, phenyl acrylonitrile and α-chloroacrylonitrile, and specifically the vinyl cyanide-based monomer may be acrylonitrile.

The acrylic rubber graft copolymer may be obtained by graft copolymerization of a vinyl-based monomer to an acrylic rubber polymer, and preferably obtained by graft copolymerization of an aromatic vinyl-based monomer and a vinyl cyanide-based monomer to an acrylic rubber polymer. The acrylic rubber polymer may be prepared by crosslinking a (meth)acrylate monomer, preferably a C4-C10 alkyl (meth)acrylate-based monomer, and more preferably a butyl acrylate. The aromatic vinyl-based monomer and the vinyl cyanide-based monomer may be the same as those used for graft copolymerization of the diene-based rubber graft copolymer.

2) Vinyl Cyanide-Aromatic Vinyl-Based Copolymer

A vinyl cyanide-aromatic vinyl-based copolymer may provide excellent processability, impact resistance, transparency, gloss, chemical resistance, and heat resistance to a thermoplastic resin composition.

The vinyl cyanide-aromatic vinyl-based copolymer may be obtained by graft copolymerization of an aromatic vinyl-based compound and a vinyl cyanide-based compound, and preferably obtained by graft copolymerization of an aromatic vinyl-based monomer and a vinyl cyanide-based monomer. The aromatic vinyl-based monomer and the vinyl cyanide-based monomer may be the same monomer as described in 1. 1).

According to an embodiment of the present invention, the cyanide-aromatic vinyl-based copolymer has a weight average molecular weight of 150,000 g/mol to 300,000 g/mol. In this case, the thermoplastic resin composition may have a flow index (4 g to 7 g/10 min) suitable for the extrusion process, and accordingly, the composition may have excellent compression processability. In addition, the scratch resistance of a molded product formed from the thermoplastic resin composition may be improved.

According to an embodiment of the present invention, the base resin may include a diene-based rubber graft copolymer, an acrylic rubber graft copolymer, and a vinyl cyanide-aromatic vinyl-based copolymer. In this case, the processability of the thermoplastic resin composition may be further improved, and the scratch resistance of the molded product prepared from the thermoplastic resin composition may be further improved.

According to an embodiment of the present invention, the diene-based rubber graft copolymer may be included in an amount of 15 parts by weight to 30 parts by weight with respect to 100 parts by weight of the base resin. Specifically, with respect to 100 parts by weight of the base resin, the amount of the diene-based rubber graft copolymer may be 16 parts by weight to 20 parts by weight, 16 parts by weight to 19 parts by weight, or 19 parts by weight to 20 parts by weight. When the amount of the diene-based rubber graft copolymer is within the above range, the processability, impact resistance, heat resistance, and the like of the thermoplastic resin composition may be further improved.

According to an embodiment of the present invention, the acrylic rubber graft copolymer may be included in an amount of 1 part by weight to 15 parts by weight with respect to 100 parts by weight of the base resin. Specifically, with respect to 100 parts by weight of the base resin, the amount of the acrylic rubber graft copolymer may be 8 parts by weight to 15 parts by weight, 10 parts by weight to 15 parts by weight, or 8 parts by weight to 10 parts by weight. When the amount of the acrylic rubber graft copolymer is within the above range, the processability, impact resistance, weather resistance, chemical resistance, colorability, whitening property, and the like of the thermoplastic resin composition may be further improved.

According to an embodiment of the present invention, the vinyl cyanide-aromatic vinyl-based copolymer may be included in an amount of 50 parts by weight to 80 parts by weight with respect to 100 parts by weight of the base resin. Specifically, with respect to 100 parts by weight of the base resin, the amount of the vinyl cyanide-aromatic vinyl-based copolymer may be 69 parts by weight to 73 parts by weight, 69 parts by weight to 70 parts by weight, or 70 parts by weight to 73 parts by weight. When the vinyl cyanide-aromatic vinyl-based copolymer is within the above range, the processability of the thermoplastic resin composition may be further improved. Specifically, the thermoplastic resin composition may have a flow index (4 to 7 g/10 min) suitable for the extrusion process, and the compression processability of the thermoplastic resin composition may be further improved.

2. Silicone Oil

A composition according to an embodiment of the present invention includes both first silicone oil and second silicone oil having different viscosity ranges, and thus has a flow index suitable for the extrusion process to exhibit excellent extrusion processability, thereby providing a resin and a molded product having excellent scratch resistance.

1) First Silicone Oil

A first silicone oil having a viscosity of 100 cPs to 1,000 cPs as measured according to ASTM D445 may be excellent in compatibility with a diene-based rubber graft copolymer or an acrylic rubber graft copolymer, and may improve the extrusion processability of the thermoplastic resin composition.

According to an embodiment of the present invention, the first silicone oil may be included in an amount of 1 part by weight to 6 parts by weight with respect to 100 parts by weight of the base resin. Specifically, with respect to 100 parts by weight of the base resin, the amount of the first silicone oil may be 3 parts by weight to 5 parts by weight, 3 parts by weight to 4 parts by weight, or 4 parts by weight to 5 parts by weight. When the amount of the first silicone oil is within the above range, the processability of the thermoplastic resin composition may be further improved.

2) Second Silicone Oil

A second silicone oil having a viscosity of 5,000 cPs to 20,000 cPs as measured according to ASTM D445 may reduce the friction of a molded product formed from a thermoplastic resin composition, and also provide excellent scratch resistance to a molded product formed from the composition due to high viscosity.

According to an embodiment of the present invention, the second silicone oil may have a viscosity of 5,000 cPs to 20,000 cPs, 5,000 cPs to 15,000 cPs, or 5,000 cPs to 10,000 cPs as measured according to ASTM D445, and within this range, the second silicone oil may reduce the friction of a molded product formed from the thermoplastic resin composition, and also provide the scratch resistance to a molded product formed from the composition due to high viscosity.

According to an embodiment of the present invention, the second silicone oil may be included in an amount of 1 part by weight to 6 parts by weight with respect to 100 parts by weight of the base resin. Specifically, with respect to 100 parts by weight of the base resin, the amount of the second silicone oil may be 3 parts by weight to 5 parts by weight, 3 parts by weight to 4 parts by weight, or 4 parts by weight to 5 parts by weight. When the amount of the second silicone oil is within the above range, the scratch resistance of a molded product formed from thermoplastic resin composition may be further improved.

According to an embodiment of the present invention, a weight ratio of the first silicone oil to the second silicone oil may be 3:5 to 5:3. Specifically, a weight ratio of the first silicone oil to the second silicone oil may be 3:5 to 1:1 or 1:1 to 5:3. When a weight ratio of the first silicone oil to the second silicone oil is within the above range, the processability of the thermoplastic resin composition may be further improved, and the scratch resistance of the molded product formed from the thermoplastic resin composition may be further improved.

According to an embodiment of the present invention, the thermoplastic resin composition may have a flow index of 4 g/10 min to 7 g/10 min as measured under a load of 10 kg according to ASTM D1238. When the flow index of thermoplastic resin composition as measured according to ASTM D1238 is within the above range, the thermoplastic resin composition may be excellent in processability, and in particular, may be more excellent in extrusion processability.

A resin or a molded product prepared from the thermoplastic resin composition may have an izod impact strength of 20 kgf·cm/cm or more as measured according to ASTM D256. In this case, a molded product prepared from the thermoplastic resin composition may have excellent impact resistance, and thus may not be easily damaged by external impact after vacuum molding.

The thermoplastic resin composition according to an embodiment of the present invention may be a thermoplastic resin composition for extrusion molding used for a material for an inner cabinet of a refrigerator, but is not limited thereto.

Hereinafter, in order to describe the present invention in detail, detail description will be given with reference to examples. However, the examples according to the present invention may be modified in various other forms, and the scope of the present invention is not construed as being limited to the examples described below. The examples of the present specification are provided to more completely explain the present invention to those of ordinary skill in the art.

EXAMPLES AND COMPARATIVE EXAMPLES

The specifications of components used in Examples and Comparative Examples below are as follows.

(A) Diene-based rubber graft copolymer: an acrylonitrile-butadiene-styrene graft copolymer (DP270E, LG Chem Co.) was used.

(B) Acrylic rubber graft copolymer: an acrylonitrile-styrene-acrylate graft copolymer (SA927, LG chem) was used.

(C) Vinyl cyanide-aromatic vinyl-based copolymer: styrene-acrylonitrile copolymer (97HC, LG chem) having a weight average molecular weight of 180,000 g/mol was used.

(D-1) First silicone oil: a first silicone oil (KF96-500cs, ShinEtsu) having a viscosity of 500 cPs as measured according to ASTM D445 was used.

(D-2) First silicone oil: a first silicone oil (KF96-100cs, ShinEtsu) having a viscosity of 100 cPs as measured according to ASTM D445 was used.

(D-3) First silicone oil: a first silicon oil (KF96-1000cs, ShinEtsu) having a viscosity of 1,000 cPs as measured according to ASTM D445 was used.

(E-1) Second silicone oil: a second silicone oil (KF96-10000cs, ShinEtsu) having a viscosity of 10,000 cPs as measured according to ASTM D445 was used.

(E-2) Second silicone oil: a second silicone oil (KF96-5000cs, ShinEtsu) having a viscosity of 5,000 cPs as measured according to ASTM D445 was used.

(F) Third silicone oil: a third silicone oil (KF96-50cs, ShinEtsu) having a viscosity of 50 cPs as measured according to ASTM D445 was used.

(G) Fourth silicone oil: a fourth silicone oil (KF96-2000cs, ShinEtsu) having a viscosity of 2,000 cPs as measured according to ASTM D445 was used.

(H) Fifth silicone oil: a fifth silicone oil (KF96-30000cs, ShinEtsu) having a viscosity of 30,000 cPs as measured according to ASTM D445 was used.

A thermoplastic resin composition was prepared by mixing the above-described components in amounts shown in Tables 1 to 3 below.

Experimental Example 1

A thermoplastic resin composition of Examples and Comparative Examples were put into an extruder, then melted, mixed, and extruded to produce pellets, and the physical properties thereof were evaluated by the method described below, and the results are shown in Table 1 and 2.

1) Extrusion Processability Evaluation

When the thermoplastic resin composition of Examples and Comparative Examples was extruded at 220° C. using an extruder (product name, HAAKE Co.), the torque applied to the screw was measured for 5 minutes. At this time, pellets were obtained from the extruded pellet strands at respective sites of the initial, middle and end stages of the extrusion, the pellets were injected to prepare specimens, then the tensile strength was measured, and extrusion processability was evaluated according to the following evaluation criteria.

- O: If the torque deviation is 5% or less, and a tensile strength deviation between the pellets (3 pieces) obtained at the respective sites of the initial, middle and end stages of extrusion is 3% or less
- X: If the deviation in torque is more than 5%, or the difference in tensile strength between the pellets (3 pieces) obtained at the respective sites of the initial, middle and end stages of extrusion is more than 3%

2) Flow Index (MI) Measurement

Using the MI-4 of GOTTFERT Co. according to ASTM D1238, the weight of a resin melted for 10 minutes under the conditions of a temperature of 220° C. and a load of 10 kg was measured.

Experimental Example 2

The pellets prepared in Experimental Example 1 were extrusion-molded to prepare specimens, and the physical properties thereof were evaluated by the method described below, and the results are shown in Table 1 and 2 below.

1) Scratch Resistance Evaluation

A specimen prepared using a thermoplastic resin composition prepared by mixing 29 parts by weight of an acrylonitrile-butadiene-styrene graft copolymer (DP270E, LG chem) and 71 parts by weight of a styrene-acrylonitrile copolymer (97HC, LG chem) was used as a reference for evaluation of scratch resistance.

Using a rubbing test machine, the scratch resistance of each specimen was evaluated. Specifically, the same specimens were respectively attached to one surface and a side surface of the rubbing tester, rubbed at a rate of 50 cycles/minute for 2 minutes, and then the scratch was observed with an optical microscope. The evaluation criteria are as follows.

- O: If the number of scratches is fewer (½ or less) than the reference
- X: If the number of scratches is larger than the reference

TABLE 1

| Division | Examples | | | | | | | |
|---|---|---|---|---|---|---|---|---|
| | 1 | 2 | 3 | 4 | 5 | 6 | 7 | 8 |
| (A) Diene-based rubber graft copolymer (part by weight) | 20 | 19 | 16 | 19 | 19 | 19 | 19 | 19 |
| (B) Acrylic rubber graft copolymer (part by weight) | 10 | 8 | 15 | 8 | 8 | 8 | 8 | 8 |
| (C) Vinyl cyanide-aromatic vinyl-based copolymer (part by weight) | 70 | 73 | 69 | 73 | 73 | 73 | 73 | 73 |
| (D-1) First silicone oil (part by weight) | 3 | 4 | 5 | — | — | 4 | — | — |
| (D-2) First silicone oil (part by weight) | — | — | — | 4 | — | — | 4 | — |
| (D-3) First silicone oil (part by weight) | — | — | — | — | 4 | — | — | 4 |
| (E-1) Second silicone oil (part by weight) | 5 | 4 | 3 | 4 | 4 | — | — | — |
| (E-2) Second silicone oil (part by weight) | — | — | — | — | — | 4 | 4 | 4 |
| Flow index (g/10 min) | 4.2 | 4.8 | 4.3 | 5.1 | 4.6 | 5.4 | 5.6 | 5.3 |
| Excellent extrusion processability | O | O | O | O | O | O | O | O |
| Scratch resistance | O | O | O | O | O | O | O | O |

TABLE 2

| Division | Comparative Examples | | | | |
|---|---|---|---|---|---|
| | 1 | 2 | 3 | 4 | 5 |
| (A) Diene-based rubber graft copolymer (part by weight) | 20 | 20 | 20 | 19 | 19 |
| (B) Acrylic rubber graft copolymer (part by weight) | 10 | 10 | 10 | 8 | 8 |
| (C) Vinyl cyanide-aromatic vinyl-based copolymer (part by weight) | 70 | 70 | 70 | 73 | 73 |
| (D-1) First silicone oil (part by weight) | — | 5 | — | — | 4 |
| (E-1) Second silicone oil (part by weight) | 5 | — | 4 | 4 | — |
| (F) Third silicone oil (part by weight) | — | — | 4 | — | — |
| (G) Fourth silicone oil (part by weight) | — | — | — | 4 | — |
| (H) Fifth silicone oil (part by weight) | — | — | — | — | 4 |
| Flow index (g/10 min) | 4.3 | 4.5 | 4.3 | 3.7 | 2.7 |
| Excellent extrusion processability | O | O | O | X | X |
| Scratch resistance | X | X | X | O | O |

Referring to Table 1 and Table 2, the thermoplastic resin compositions of Examples 1 to 8 each have a flow index (4 to 7 g/10 min) suitable for the extrusion process and thus have excellent extrusion processability. In addition, the scratch resistance of a specimen prepared from the composition is excellent, and it may thus be confirmed that the composition may provide a specimen having excellent durability.

On the other hand, it may be confirmed that the specimen prepared from the thermoplastic resin composition of Comparative Example 1 including the second silicone oil having a viscosity of 10,000 cPs without including the first silicone oil having a viscosity of 100 cPs to 1,000 cPs, the thermoplastic resin composition of Comparative Example 2 including the first silicone oil having a viscosity of 500 cPs without including the second silicone oil having a viscosity of 5,000 cPs to 20,000 cPs, and the thermoplastic resin composition of Comparative Example 3 including the third silicone oil having a viscosity of 50 cPs and the second silicone oil having a viscosity of 10,000 cPs without including the first silicone oil having a viscosity of 100 cPs to 1,000 cPs cause a problem in scratch resistance.

In addition, it may be confirmed that the thermoplastic resin composition of Comparative Example 4 including the fourth silicone oil having a viscosity of 2,000 cPs and the second silicone oil having a viscosity of 10,000 cPs without including the first silicone oil having a viscosity of 100 cPs to 1,000 cPs, and the thermoplastic resin composition of Comparative Example 5 including the fifth silicone oil having a viscosity of 30,000 cPs and the first silicone oil having a viscosity of 500 cPs without including the second silicone oil having a viscosity of 5,000 cPs to 20,000 cPs may not ensure a sufficient flow index, and thus exhibit poor extrusion processability.

Therefore, it may be seen that the thermoplastic resin composition according to an embodiment of the present invention may be used as a composition for extrusion molding by virtue of excellent extrusion processability, and may provide a molded product with improved scratch resistance.

The invention claimed is:

1. A thermoplastic resin composition comprising:
   a base resin comprising a rubber graft copolymer and a vinyl cyanide-aromatic vinyl-based copolymer;
   a first silicone oil having a viscosity of 100 cPs to 1,000 cPs at 25° C., measured according to ASTM D445; and
   a second silicone oil having a viscosity of 5,000 cPs to 20,000 cPs at 25° C., measured according to ASTM D445.

2. The thermoplastic resin composition of claim 1, wherein the thermoplastic resin composition comprises the first silicone oil in an amount of 1 part by weight to 6 parts by weight with respect to 100 parts by weight of the base resin.

3. The thermoplastic resin composition of claim 1, wherein the thermoplastic resin composition comprises the second silicone oil in an amount of 1 part by weight to 6 parts by weight with respect to 100 parts by weight of the base resin.

4. The thermoplastic resin composition of claim 1, wherein the thermoplastic resin composition comprises the first silicone oil and the second silicone oil in a weight ratio of 3:5 to 5:3.

5. The thermoplastic resin composition of claim 1, wherein the rubber graft copolymer comprises at least one selected from a diene-based rubber graft copolymer and an acrylic rubber graft copolymer.

6. The thermoplastic resin composition of claim 1, wherein the vinyl cyanide-aromatic vinyl-based copolymer has a weight average molecular weight of 150,000 g/mol to 300,000 g/mol.

7. The thermoplastic resin composition of claim 1, wherein the base resin comprises a diene-based rubber graft copolymer, an acrylic rubber graft copolymer, and a vinyl cyanide-aromatic vinyl-based copolymer.

8. The thermoplastic resin composition of claim 7, wherein the thermoplastic resin composition comprises the diene-based rubber graft copolymer in an amount of 15 parts by weight to 30 parts by weight with respect to 100 parts by weight of the base resin.

9. The thermoplastic resin composition of claim 7, wherein the thermoplastic resin composition comprises the acrylic rubber graft copolymer in an amount of 1 part by weight to 15 parts by weight with respect to 100 parts by weight of the base resin.

10. The thermoplastic resin composition of claim 7, wherein the thermoplastic resin composition comprises the vinyl cyanide-aromatic vinyl-based copolymer in an amount of 50 parts by weight to 80 parts by weight with respect to 100 parts by weight of the base resin.

11. The thermoplastic resin composition of claim 1, wherein the thermoplastic resin composition has a flow index of 4 g/10 min to 7 g/10 min, measured according to ASTM D1238 under the conditions of a temperature of 220° C. and a load of 10 kg.

* * * * *